(12) United States Patent
Graham

(10) Patent No.: US 10,133,350 B1
(45) Date of Patent: Nov. 20, 2018

(54) ELECTROCONDUCTIVE TOUCHSCREEN GLOVE

(71) Applicant: David Graham, Port St. Lucie, FL (US)

(72) Inventor: David Graham, Port St. Lucie, FL (US)

( * ) Notice: Subject to any disclaimer, the term of this patent is extended or adjusted under 35 U.S.C. 154(b) by 393 days.

(21) Appl. No.: 15/137,668

(22) Filed: Apr. 25, 2016

(51) Int. Cl.
*G06F 3/01* (2006.01)
*A41D 27/08* (2006.01)
*A41D 13/08* (2006.01)

(52) U.S. Cl.
CPC ........... *G06F 3/014* (2013.01); *A41D 13/087* (2013.01); *A41D 27/08* (2013.01); *A41D 2300/322* (2013.01)

(58) Field of Classification Search
CPC . G06F 3/014; A41D 13/087; A41D 2300/322; A41D 27/08
USPC .................................................. 2/16, 20, 21
See application file for complete search history.

(56) References Cited

U.S. PATENT DOCUMENTS

| | | | |
|---|---|---|---|
| 6,009,557 A | 1/2000 | Witta | |
| D603,581 S | 11/2009 | Rimando | |
| 7,620,999 B2 | 11/2009 | Winningham | |
| 8,646,115 B1* | 2/2014 | Baunach | A41D 19/0013 2/158 |
| 8,730,194 B2 | 5/2014 | Vellanki | |
| 2012/0000002 A1* | 1/2012 | Prince | A41D 13/087 2/21 |
| 2012/0137403 A1* | 6/2012 | Bone | G06F 3/03545 2/163 |
| 2012/0266345 A1* | 10/2012 | Shambayati | A41D 13/087 2/21 |
| 2016/0143369 A1* | 5/2016 | Lewis | A63H 33/00 2/69 |

* cited by examiner

*Primary Examiner* — Katherine Moran

(57) ABSTRACT

An electroconductive touchscreen glove including a thumb pocket and an index finger pocket separated therefrom by a gap and leaves a user's other fingers exposed. An electroconductive contact layer, disposed on each of an entire front end and tip of the respective thumb pocket and the index finger pocket, is contactable with and operationally communicable with a capacitive touchscreen of an electronic device, such as a cellular phone or an iPad®, for example, to permit the user's direct control the actions of the touchscreen. First and second zippers are disposed on the thumb and index finger pockets, respectively. A connector body, such as a linked chain, has first and second ends attached to a slider on the first and second zippers, respectively, to secure the pockets on the user's thumb and index finger and to prevent the pockets from getting separated and misplaced or lost during non-use of the glove.

4 Claims, 3 Drawing Sheets

ELECTROCONDUCTIVE TOUCHSCREEN GLOVE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of data input assisting devices for controlling resistive and capacitive touchscreens are known in the prior art. However, what is needed is an electroconductive touchscreen glove including a thumb pocket and an index finger pocket separated therefrom by a gap and leaves a user's other fingers exposed. An electroconductive contact layer, disposed on each of an entire front end and tip of the respective thumb pocket and the index finger pocket, is contactable with and operationally communicable with a capacitive touchscreen of an electronic device, such as a cellular phone or an iPad®, for example, to permit the user's direct control the actions of the touchscreen. First and second zippers are disposed on the thumb and index finger pockets, respectively. A connector body, such as a linked chain, spans the gap between the thumb pocket and the index pocket by including first and second ends attached to a slider on the first and second zippers, respectively, to secure the pockets on the user's thumb and index finger and to prevent the pockets from getting separated and misplaced or lost during non-use of the glove.

FIELD OF THE INVENTION

The present invention relates to data input assisting device, and more particularly, to an electroconductive touchscreen glove having a zippered thumb pocket and a zippered index finger pocket separated by a gap from the thumb pocket with a connector body disposed therebetween.

SUMMARY OF THE INVENTION

The general purpose of the present electroconductive touchscreen glove, described subsequently in greater detail, is to provide an electroconductive touchscreen glove which has many novel features that result in an electroconductive touchscreen glove which is not anticipated, rendered obvious, suggested, or even implied by prior art, either alone or in combination thereof.

To accomplish this, the present electroconductive touchscreen glove includes a thumb pocket configured to securably receive and fit a user's thumb therein and an index finger pocket separated from the thumb pocket by a gap and leaves a user's other fingers exposed. The index finger pocket is configured to securably receive and fit the user's index finger therein. The user's middle finger, ring finger, and baby finger remain uncovered when at least one of the thumb and the index finger engage the respective one of the thumb pocket and the index finger pocket. An electroconductive contact layer, disposed on each of an entire front end of the thumb pocket and an entire tip of the index finger pocket, is contactable with and operationally communicable with a capacitive touchscreen of an electronic device, such as a cellular phone or an iPad®, for example, to permit the user's direct control the actions of the touchscreen. Each of a first zipper and a second zipper is continuously disposed on the thumb pocket and the index finger pocket, respectively, and has a bottom stop to prevent a slider from disengaging a plurality of zipper teeth at a closed end thereof. The slider of each of the first zipper and the second zipper is disposed at a rear end of the thumb pocket and at a rearward end of the index finger pocket.

A connector body is provided to span the gap between the thumb pocket and the index finger pocket, to assist in securely retaining both the thumb pocket and the index finger pocket on the user's thumb and index finger, respectively, and to prevent the thumb pocket and the index finger pocket from getting separated from each other and getting misplaced or lost when the device is not in use. The connector body has a first end attached to the slider of the first zipper and a second end attached to the slider of the second zipper. The connector body is a linked chain, but can also be a durable link member, such as a length of leather cord, a cable chain, rope chain, double rope chain, box chain, curb chain, herringbone chain, and a length of interconnected beads, for example. A logo is disposed on the top end of the thumb pocket.

Thus has been broadly outlined the more important features of the present electroconductive touchscreen glove so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
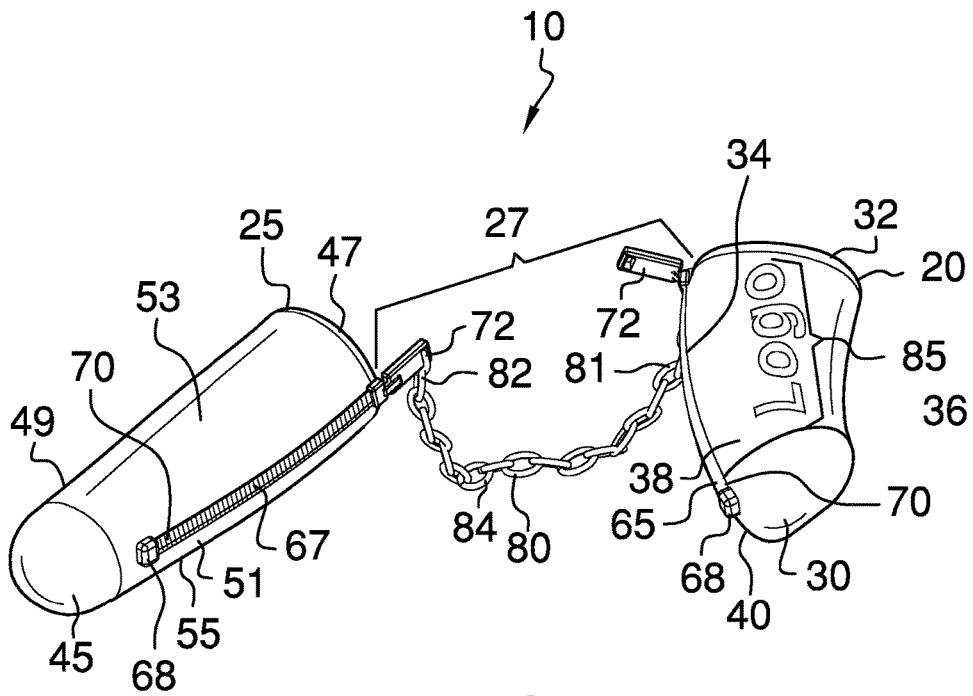
FIG. 1 is an isometric view.
Figure 2:
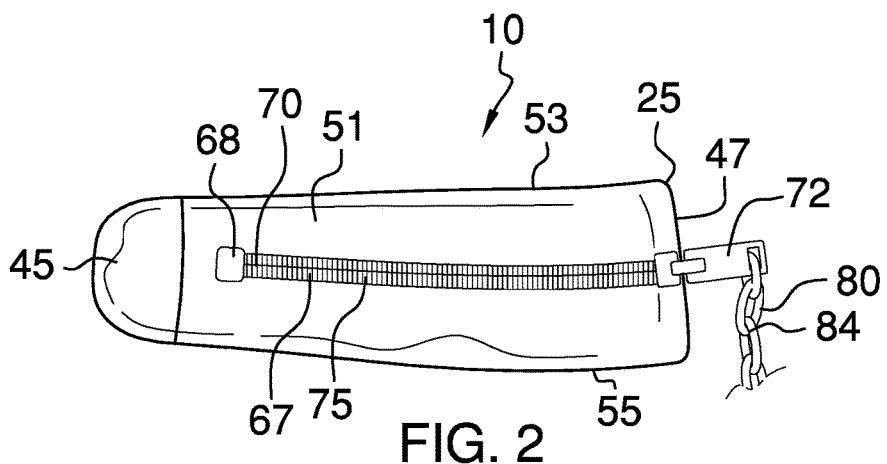
FIG. 2 is a side elevation view of
FIG. 3 is a top view with a partial cross-sectional view of each of a front end of a thumb pocket and a tip of an index finger pocket
Figure 3:
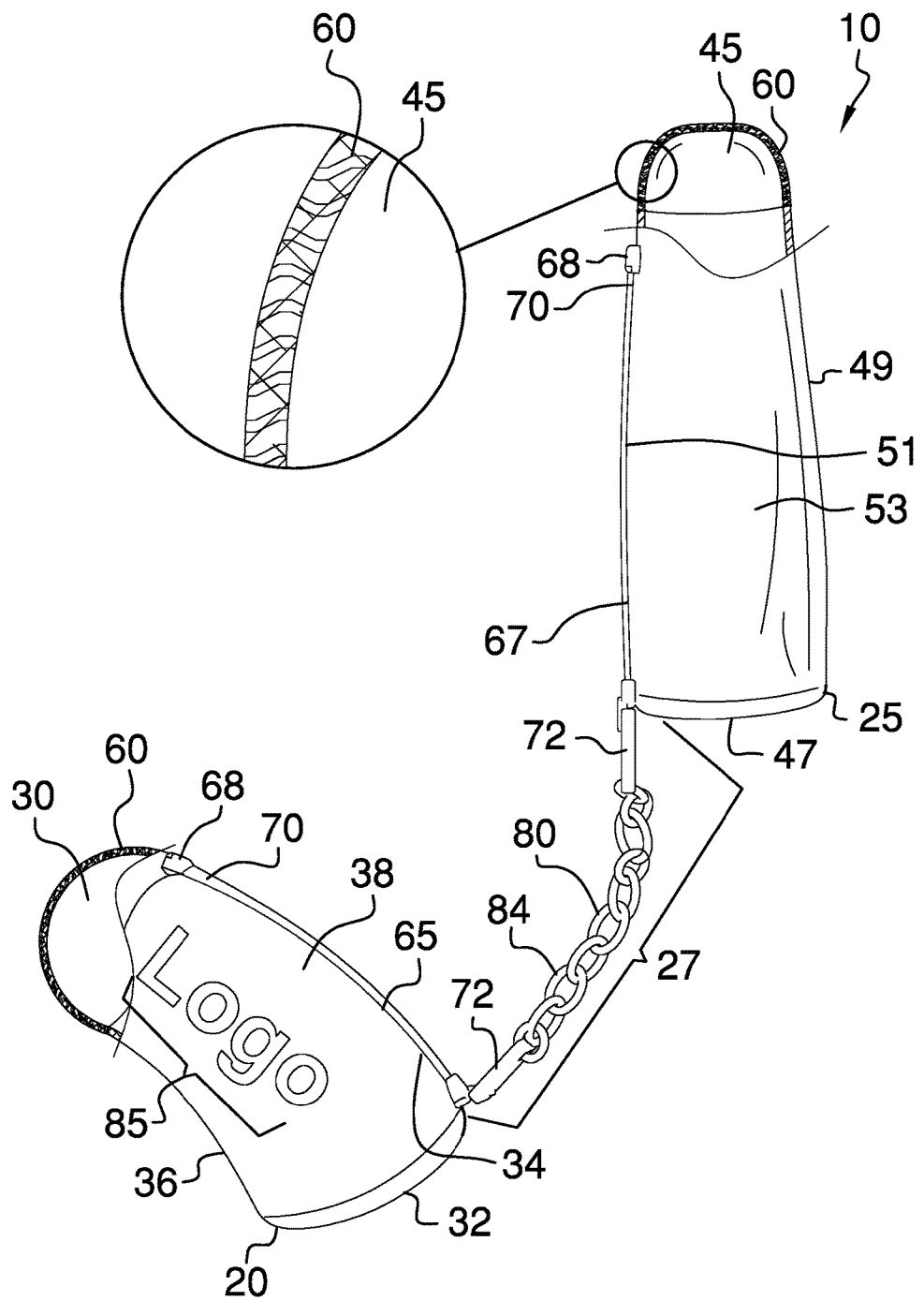
Figure 4:
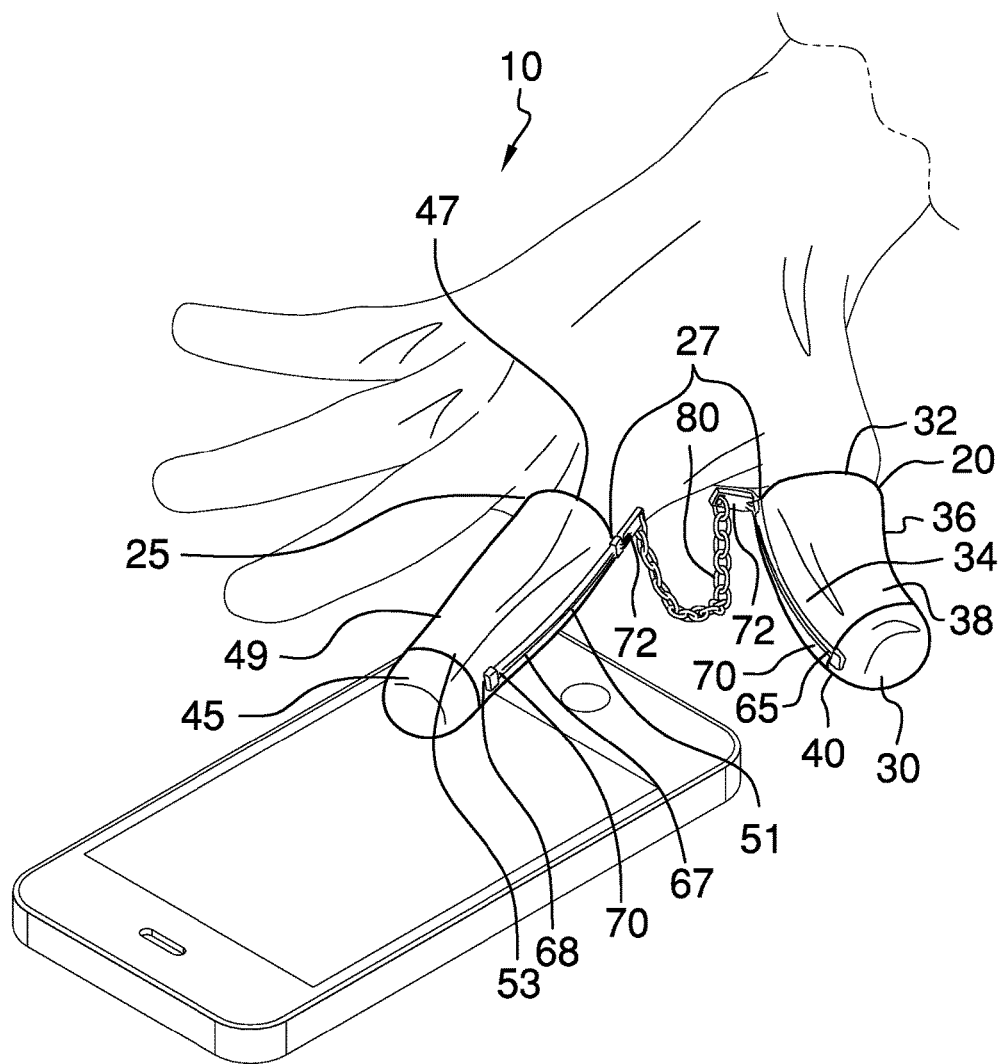
FIG. 4 is an in-use view.

With reference now to the drawings, and in particular FIGS. 1 through 4 thereof, an example of the instant electroconductive touchscreen glove employing the principles and concepts of the present electroconductive touchscreen glove and generally designated by the reference number 10 will be described.

Referring to FIGS. 1 through 4, the present electroconductive touchscreen glove 10 is illustrated. The electroconductive touchscreen glove 10 includes a thumb pocket 20 and an index finger pocket 25 completely separated from the thumb pocket 20 by a gap 27. The thumb pocket 20 has a front end 30, a rear end 32, an interior side 34, an exterior side 36, a top end 38, and a bottom end 40. The index finger pocket 25 has a tip 45, a rearward end 47, an internal side 49, an external side 51, a top side 53, and a bottom side 55. The interior side 34 of the thumb pocket 20 is disposed more proximal the index finger pocket 25 than the exterior side 36. The external side 51 of the index finger pocket 25 is disposed more proximal the thumb pocket 20 than the internal side 49. The thumb pocket 20 is configured to securably receive and fit a user's thumb therein. The index finger pocket 25 is configured to securably receive and fit the user's index finger therein. The user's middle finger, ring finger, and baby finger remain uncovered when at least one of the thumb and the index finger engage the respective one of the thumb pocket 20 and the index finger pocket 25.

An electroconductive contact layer 60 is disposed on each of the entire front end 30 of the thumb pocket 20 and the entire tip 45 of the index finger pocket 25. The electroconductive conduct layer 60 is contactable with and operationally communicable with a capacitive touchscreen of an electronic device, such as a cellular phone or an iPad®, for example. When a portion of the user's body which is uncovered by the present device 10 touches a touchscreen device, a change in the electrical charge across the touchscreen occurs and the touchscreen device is able to determine where the contact occurred and uses the information therefrom to perform a desired action. When one of the user's finger and thumb is insulated from contacting the touchscreen, no change in the capacitive layer of the touchscreen occurs and no action is performed by the touchscreen device. However, when the user's thumb or index finger is placed within the thumb pocket 20 and the index finger pocket 25, respectively, the user's thumb and index finger, respectively, come into contact with the electroconductive contact layer 60 which, in turn, facilitates communication between the user's thumb or index finger, respectively, within the respective thumb pocket 20 and index finger pocket 22 and the electronic device. When the user touches the touchscreen with one of his thumb and index finger being disposed within the respective thumb pocket 20 and index finger pocket 22, a portion of the charge from the conductor is transferred to the user, causing the electrical charge across the capacitive layer of the touchscreen to decrease which, in turn, is used to perform movements and commands on the touchscreen device by the user. The present device 10 assists the user to exert direct control over the actions of the touchscreen.

A first zipper 65 is continuously disposed on the thumb pocket 20 along the interior side 34 from the rear end 32 to proximal the front end 30. A second zipper 67 is continuously disposed on the index finger pocket 25 along the external side 51 from the rearward end 47 to proximal the tip 45. A bottom stop 68 of each of the first zipper 65 and the second zipper 67 is provided to prevent a slider 72 from disengaging a plurality of zipper teeth 75 at a closed end 70 of each of the first zipper 65 and the second zipper 67. The bottom stop 68 of the first zipper 65 is disposed proximal the front end 30. The bottom stop 68 of the second zipper 67 is disposed proximal the tip 45. The slider 72 of each of the first zipper 65 and the second zipper 67 is disposed at the rear end 32 of the thumb pocket 20 and at the rearward end 47 of the index finger pocket 25.

A connector body 80 is provided to span the gap 27 between the thumb pocket 20 and the index finger pocket 25. The connector body 80 has a first end 81 and a second end 82. The first end 81 is attached to the slider 72 of the first zipper 65 and the second end 82 is attached to the slider 72 of the second zipper 67. The connector body 80 is a linked chain 84.

A logo 85 is disposed on the top end 38 of the thumb pocket 20 to promote use of the device 10.

What is claimed is:

1. An electroconductive touchscreen glove comprising:
a thumb pocket having a front end, a rear end, an interior side, an exterior side, a top end, and a bottom end;
an index finger pocket completely separated from the thumb pocket by a gap, the index finger pocket having a tip, a rearward end, an internal side, an external side, a top side, and a bottom side, the interior side of the thumb pocket being disposed more proximal the index finger pocket than the exterior side, the external side of the index finger pocket being disposed more proximal the thumb pocket than the internal side;
an electroconductive contact layer disposed on each of the entire front end of the thumb pocket and the entire tip of the index finger pocket;
a first zipper continuously disposed on the thumb pocket along the interior side from the rear end to proximal the front end;
a second zipper continuously disposed on the index finger pocket along the external side from the rearward end to proximal the tip;
a bottom stop of each of the first zipper and the second zipper, the bottom stop of the first zipper disposed proximal the front end, the bottom stop of the second zipper disposed proximal the tip;
a slider of each of the first zipper and the second zipper, the slider of the first zipper disposed at the rear end of the thumb pocket, the slider of the second zipper disposed at the rearward end of the index finger pocket; and
a connector body having a first end and a second end, the first end being attached to the slider of the first zipper, the second end being attached to the slider of the second zipper;
wherein the electroconductive contact layer is contactable with and operationally communicable with a capacitive touchscreen; and
wherein the user's middle finger, ring finger, and baby finger remain uncovered when at least one of the thumb and the index finger engage the respective one of the thumb pocket and the index finger pocket.

2. The electroconductive touchscreen glove of claim 1 wherein the connector body is a linked chain.

3. The electroconductive touchscreen glove of claim 1 comprising a logo disposed on the top end of the thumb pocket.

4. An electroconductive touchscreen glove comprising:
a thumb pocket having a front end, a rear end, an interior side, an exterior side, a top end, and a bottom end;
an index finger pocket completely separated from the thumb pocket by an opening, the index finger pocket having a tip, a rearward end, an internal side, an external side, a top side, and a bottom side, the interior side of the thumb pocket being disposed more proximal the index finger pocket than the exterior side, the external side of the index finger pocket being disposed more proximal the thumb pocket than the internal side;
an electroconductive contact layer disposed on each of the entire front end of the thumb pocket and the entire tip of the index finger pocket;
a first zipper continuously disposed on the thumb pocket along the interior side from the rear end to proximal the front end;
a second zipper continuously disposed on the index finger pocket along the external side from the rearward end to proximal the tip;

a bottom stop of each of the first zipper and the second zipper, the bottom stop of the first zipper disposed proximal the front end, the bottom stop of the second zipper disposed proximal the tip;

a slider of each of the first zipper and the second zipper, the slider of the first zipper disposed at the rear end of the thumb pocket, the slider of the second zipper disposed at the rearward end of the index finger pocket;

a linked chain connector body having a first end and a second end, the first end being attached to the slider of the first zipper, the second end being attached to the slider of the second zipper; and a logo disposed on the top end of the thumb pocket;

wherein the electroconductive contact layer is contactable with and operationally communicable with a capacitive touchscreen; and wherein the user's middle finger, ring finger, and baby finger remain uncovered when at least one of the thumb and the index finger engage the respective one of the thumb pocket and the index finger pocket.

* * * * *